United States Patent [19]

Stedman

[11] B 3,981,745

[45] Sept. 21, 1976

[54] REGENERATIVE FUEL CELL

[75] Inventor: James K. Stedman, Glastonbury, Conn.

[73] Assignee: United Technologies Corporation, Hartford, Conn.

[22] Filed: Sept. 11, 1974

[21] Appl. No.: 505,126

[44] Published under the second Trial Voluntary Protest Program on February 10, 1976 as document No. B 505,126.

[52] U.S. Cl. ............................. 204/266; 204/129; 204/266; 204/DIG. 4; 429/21; 429/34
[51] Int. Cl.² ..................................... H01M 33/00
[58] Field of Search ............ 204/129, 266, DIG. 4; 136/86 R, 86 S

[56] References Cited
UNITED STATES PATENTS

| | | | |
|---|---|---|---|
| 3,489,670 | 1/1970 | Maget | 204/129 |
| 3,839,091 | 10/1974 | Bloomfield et al. | 136/86 R |

Primary Examiner—G. L. Kaplan
Assistant Examiner—A. C. Prescott
Attorney, Agent, or Firm—Stephen E. Revis

[57] ABSTRACT

A regenerative fuel cell assembly is provided in which a fuel cell is integrated with an electrolysis cell. In a preferred embodiment the fuel cell assembly and electrolysis cell assembly are spaced apart and have their hydrogen electrodes in facing relationship; a water transport matrix is disposed in the space between the hydrogen electrodes, and a water storage matrix is disposed adjacent the oxygen electrode of the fuel cell. During operation of the fuel cell the water storage matrix holds the water produced by the fuel cell; during electrolysis cell operation the water in the water storage matrix passes to the water transport matrix which carries it to the electrolysis cell where it is consumed.

1 Claim, 3 Drawing Figures

REGENERATIVE FUEL CELL

BACKGROUND OF THE INVENTION

1. Field of the Invention

This invention relates to regenerative fuel cells and particularly to a combined fuel cell and electrolysis cell unit.

2. Description of the Prior Art

Regenerative fuel cells are known in the art. One type of regenerative fuel cell known utilizes the same electrodes for the fuel cell during one mode of operation and for the electrolysis cell during the regeneration mode. While it is possible to perform both power generation and electrolysis with a single cell operating in a fuel cell mode at one time and in an electrolysis cell mode at another time, it is not advantageous to do so. Separating the fuel cell from the electrolysis cell permits independent optimization of the materials and configurations of each cell. Performance and durability are not as good if one cell is required to function in both modes. For example, fuel cell oxygen electrodes using a platinum catalyst have demonstrated excellent endurance and performance. However, if this type of electrode is used to evolve oxygen in an electrolysis cell, the high operating potential results in the formation of platinum oxide which reacts with the electrolyte to form soluble $Pt\ O^=_3$ ions. Subsequent operation of this electrode in the fuel cell mode causes these ions to migrate to the hydrogen electrode where they are chemically reduced to platinum metal which forms platinum dendrites on the hydrogen electrode. This catalyst migration eventually causes low performance, and the platinum dendrites may cause gas evolution in the electrolyte cavity and subsequent failure of the cell.

Another type of regenerative cell known in the art physically separates the fuel cell from the electrolysis cell. This configuration requires ancillary equipment such as pressure vessels, valves, pumps, controls and interconnecting plumbing to accomplish storage and transfer of water and reactant gases, which makes the system less reliable, costly, and reduces the net electrical power of the fuel cell since some of the electrical energy generated by the fuel cell must be used to power the ancillary equipment.

Our invention obviates the disadvantages and drawbacks of the above-mentioned two types of regenerative fuel cells.

SUMMARY OF THE INVENTION

It is an object of the present invention to provide a regenerative fuel cell which can be a completely hermetically sealed system, and one which is capable of substantially 100% depth of discharge and yet be fully rechargeable.

It is another object of the present invention to provide a regenerative fuel cell which has water transport and reactant gas transport means which utilize no moving parts and are, therefore, static.

It is another object of the present invention to provide a regenerative fuel cell which has improved performance and a longer life than those regenerative fuel cells known in the art.

It is a further object of the present invention to provide a regenerative fuel cell which has improved water transport capability between the fuel cell and the electrolysis cell.

In accordance with the present invention a regenerative fuel cell which attains the above objectives and others is provided by the combination of at least one fuel cell and one electrolysis cell spaced apart from each other and having their hydrogen electrodes in facing relationship. Water produced at the fuel cell is transported to the electrolysis cell during electrolysis cell operation by a water matrix disposed between and in contact with the hydrogen electrodes of the fuel cell and electrolysis cell. Water storage may, in one embodiment, be accomplished by the water matrix or, preferably, by a separate water storage matrix associated with the fuel cell. In the latter preferred embodiment the water matrix can be optimized for transporting capability and the water storage matrix can be optimized for storing capacity.

In a related application of common assignee titled "Regenerative Fuel Cell" by David Bloomfield, Neil Hassett, and James Stedman (the applicant of the present application) Ser. No. 306,255 filed on Nov. 11, 1973, a fuel cell and electrolysis cell are disposed adjacent one another and have their hydrogen electrodes in facing relationship and spaced apart to form a hydrogen passage therebetween. Each cell has a water storage matrix associated therewith. As water is produced at the fuel cell it is stored in the water storage matrix associated with the fuel cell and is transported, due to the water vapor partial pressure gradient, by vapor diffusion across the hydrogen passage between the cells to the water storage matrix associated with the electrolysis cell whence it may be used during electrolysis cell operation. With this arrangement a separate water storage matrix must be associated with each cell. If there is no water storage matrix associated with the electrolysis cell the electrolysis cell might dry out because the water stored at the fuel cell side could not get across the hydrogen passage fast enough by the process of vapor diffusion during electrolysis cell operation; furthermore, without a water storage matrix at the electrolysis cell side, water vapor being transported across the hydrogen passage during fuel cell operation cannot be stored by the electrolysis cell and might flood the electrolysis cell since the electrolyte matrix of the electrolysis cell cannot expand to hold excess water. The present invention is an improvement over Bloomfield et al in that it eliminates the need for a water storage matrix of the electrolysis cell side of the system and has improved water transport capabilities between the cells.

In the present invention, during fuel cell operation hydrogen and oxygen are reacted in the fuel cell to generate electricity and form water. This water dilutes the fuel cell electrolyte and causes it to expand into the water storage matrix associated with the fuel cell. As the concentration of fuel cell electrolyte declines, the equilibrium water vapor pressure over the electrolyte rises thereby establishing a water vapor pressure gradient (i.e., partial pressure differential) across the space between the fuel cell and the electrolysis cell, as is also the case with the system of Bloomfield et al; however, in the present invention there is a water transport matrix disposed in the space between the fuel cell and the electrolysis cell, and this water transport matrix is in fluid communication with the fuel cell water storage matrix so that there is not only a partial pressure differential between the fuel cell and electrolysis cell, which results in some vapor diffusion between the cells, but, most importantly, there is also a water concentration gradient resulting in liquid diffusion from the water storage matrix to the water transport matrix and across the water transport matrix to the hydrogen electrode of the electrolysis cell. In addition, there is a bulk liquid flow toward the electrolysis cell due to capillary pressure differentials in the water transport matrix. Thus, water may be transported from the fuel cell to the electrolysis cell at a much greater rate than in Bloomfield et al which relies solely on vapor diffusion. Furthermore, even without a water storage matrix on the electrolysis cell side of the system the electrolysis cell will not dry out since a vapor pressure gradient is not relied on to keep the electrolysis cell moist. Additionally, it is obvious that in the present invention the water storage matrix associated with the fuel cell serves as the water storage matrix for the entire system and there is no problem with the electrolysis cell flooding out for lack of a water storage matrix to hold excess water. Natural capillary and diffusion forces automatically control water storage and transport. In either the fuel cell or the electrolysis cell mode of operation the rate of water transport across the water transport matrix is a function of the relative electrolyte concentration in the cells. This concentration difference is proportional to the rate of water production by the fuel cell or consumption by the electrolysis cell. This system automatically compensates for changes in power production or operating mode and needs no auxiliary controls or moving parts.

Other advantages of our regenerative fuel cell are: The oxygen electrode catalysts can be different, thereby allowing optimization for increased performance and life. For example, nickel can be used as the oxygen electrode catalyst in the electrolysis cell, while platinum can be used as the oxgyen electrode catalyst in the fuel cell. The use of nickel for the electrolysis cell oxygen electrode is not only less expensive but also gives a lower polarization voltage at the same current density than other catalysts known and obviates the catalyst migration problem, discussed heretofore, occurring when the same electrode is utilized for both the fuel cell and the electrolysis cell.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
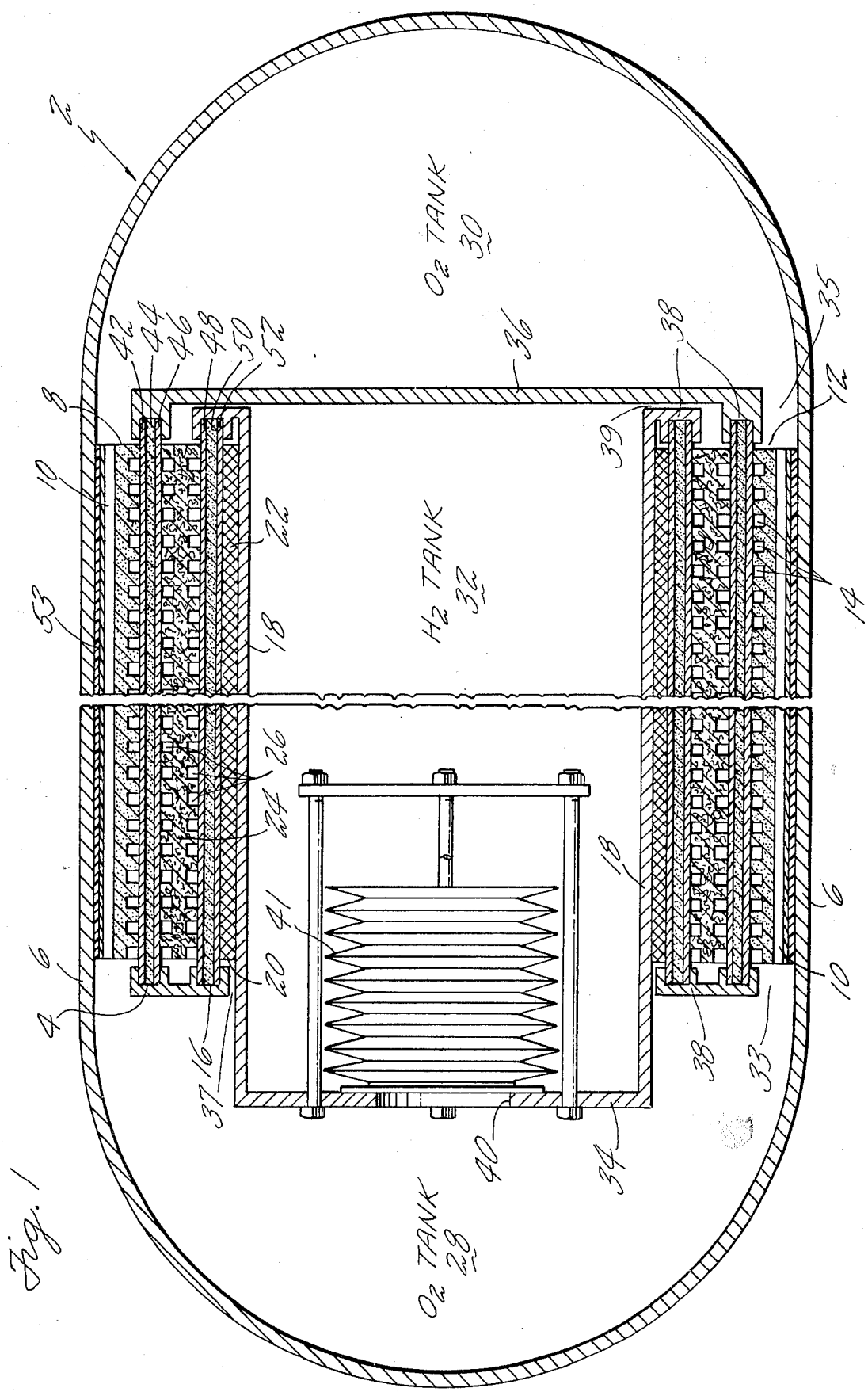
FIG. 1 is a schematic illustration of an embodiment of a regenerative fuel cell system in accordance with the present invention.

Referring to FIG. 1, there is shown a housing 2. A fuel cell 4 is radially disposed within the housing 2 and is spaced from an outer wall 6 thereof defining an oxygen passage 12 therebetween. Disposed within said passage 12 is a water storage matrix 8 adjacent the fuel cell and an electrically nonconductive corrugation 10 disposed between the water storage matrix and the outer wall 6. The water storage matrix 8 includes passages 14 in gas communication with the fuel cell 4; the passages 14 are also in gas communication with the oxygen passage 12 by means of other passageways within the water storage matrix 8 which are not shown. An electrolysis cell 16 is radially disposed within the housing 2 and is spaced from the inner wall 18 by a screen 20, thereby forming an oxygen passage 22 between the electrolysis cell 16 and the inner wall 18. The fuel cell 4 and the electrolysis cell 16 are spaced from one another as shown in the drawing. Disposed within that space is a water transport matrix 24 having hydrogen passages 26 formed therein in gas communication with the fuel cell 4 and the electrolysis cell 16. Preferably, hydrogen passages 26 in communication with the fuel cell 4 and hydrogen passages 26 in communication with the electrolysis cell 16 are in gas communication with each other so that the gas pressure at the fuel cell is the same as the gas pressure at the electrolysis cell. Oxygen storage means 28, 30 are provided in the ends of the housing 2 and are in gas communication with the oxygen passages 12, 22. Hydrogen storage means 32 is provided by the inner wall 18, the wall 34 and the wall 36, and is in gas communication with the hydrogen passages 26. Gas seals 38 are provided to seal the hydrogen passages 26 from communication with the oxygen passages 12, 22 and they define, in combination with the walls 6, 18 and 36 connecting passageways 33, 35, 37 and 39 between the oxygen storage means 28, 30 and the oxygen passage 12, and the hydrogen storage means and the hydrogen passages 26. The wall 34 is provided with an opening 40 into a bellows 41; this allows the hydrogen and oxygen pressures to be equalized at all times.

Figure 2:
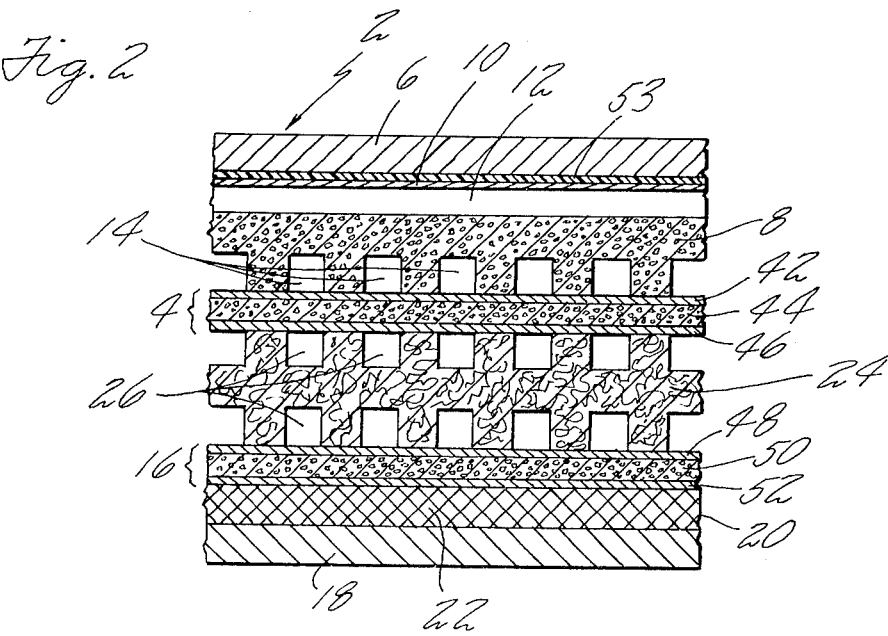
FIG. 2 is a partial detailed view of the integrated fuel cell/electrolysis cell shown in FIG. 1.

In FIG. 2, which is a detailed view of the integrated fuel cell/electrolysis cell shown in FIG. 1, like numerals refer to like components. The fuel cell 4 is shown having an oxygen electrode 42, and electrolyte storage matrix 44 and a hydrogen electrode 46. The electrolysis cell 16 is shown having a hydrogen electrode 48, an electrolyte storage matrix 50 and an oxygen electrode 52. The electrically nonconductive corrugation 10 preferably takes the form of corrugated metal, which, in conjunction with the water storage matrix 8, provides good heat transfer from the fuel cell 4 to the wall 6 of the housing 2 for the rejection of waste heat, and has a coating, or sheet 53 of dielectric material, such as polytetrafluoroethylene on its surface adjacent the wall 6 to prevent electrical conduction from the fuel cell 4 to the wall 6.

Fine pores for the water transport matrix, on the order of one-half to one-tenth of the size of the pores which are best suited for the water storage matrix, are desirable to assure that the water transport matrix is always full of electrolyte and that volume changes occur in the water storage matrix rather than in the water transport matrix. The water storage matrix 8 is preferably constructed of porous metal such as nickel having a pore size of from about 1.0–10.0 microns, but may also be made of porous plastic, asbestos, polysulfone or other porous material compatible with the electrolyte. The important characteristic of a matrix designed specifically for water storage is that it has a relatively large pore size so that its water storing capacity is as great as possible. The water transport matrix 24 is preferably made from asbestos having a pore size of from about 0.1–1.0 microns, but it may be made from any other porous material compatible with the electrolyte being used which has a pore size appropriate to its function which is the transporting of water from the fuel cell to the electrolysis cell.

In the present invention, during fuel cell operation, hydrogen and oxygen are reacted in the fuel cell to generate electricity and form water. The water dilutes the fuel cell electrolyte in the electrolyte matrix 44 and causes the diluted electrolyte to expand into the water storage matrix 8 and into the water transport matrix 24 (which also holds some liquid). These matrices 44, 8, 24 are all in fluid communication with each other. During electrolysis cell operation, water is consumed in the electrolysis cell 16, causing an increase in electrolyte concentration at the hydrogen electrode 48 of the electrolysis cell 16 resulting in a diffusion of water through the electrolyte toward the electrolysis cell 16 through the water transport matrix 24 from the fuel cell 4. Of course, as hereinabove mentioned, there will also be some vapor diffusion across the hydrogen passages 26 due to partial pressure differentials and some bulk liquid flow of electrolyte toward the electrolysis cell 16 due to capillary pressure gradients; however, these latter two methods of water transport are minor in importance relative to the liquid diffusion due to concentration gradients in the liquid electrolyte.

Figure 3:
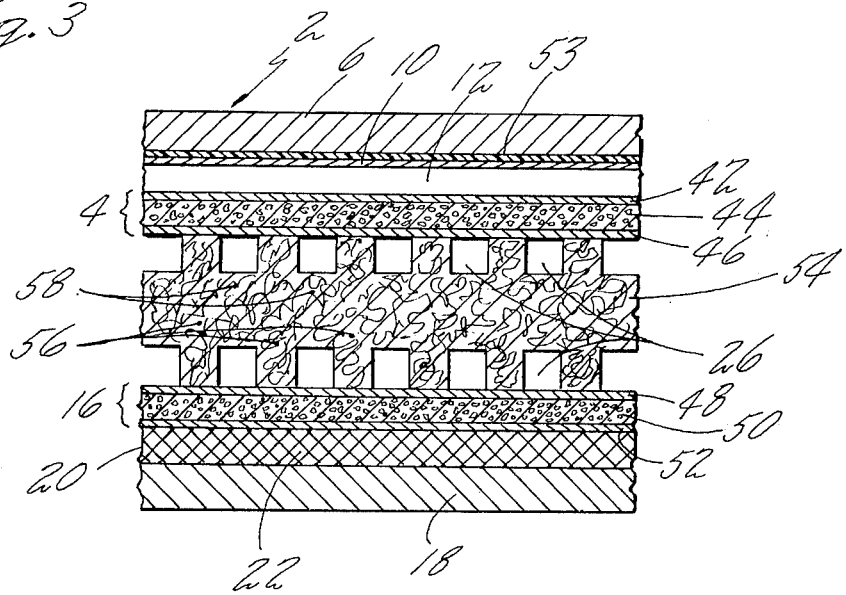
FIG. 3 is a detailed view of another embodiment of the present invention.

In FIG. 3, again, like numerals refer to like components. In this embodiment of the invention, a single water matrix 54 disposed between and in contact with the hydrogen electrode 46, 48 serves the function of both water storing and water transporting thereby eliminating the need for a separate water storage matrix such as the water storage matrix 8 in the embodiment of FIGS. 1 and 2. This may be desirable where space limitations are of utmost importance, however, since the water matrix 54 must serve two functions, the material chosen cannot be optimized for either water storage or water transport, but must be a compromise material whose physical characteristics are designed to afford a combination of both water storing and water transporting properties. Asbestos having a pore size of from 0.1–1.0 microns is one satisfactory water matrix material. As another example, the material may have fine pores facilitating water transport in those portions wherein there is a continuous, straight path running from the surface of the fuel cell hydrogen electrode 46 to the electrolysis cell hydrogen electrode 48, such as at 56, and there may be larger pores for water storage in those portions between hydrogen passages 26 such as, for example, in the area designated by the numeral 58.

While only one fuel cell and one electrolysis cell have been shown in the description of the embodiments of our invention, it will be obvious to one skilled in the art, that more than one of each type of cell may be utilized in a system.

There has thus been described preferred embodiments of a regnerative fuel cell system in accordance with the present invention. While various systems are shown in which our invention is utilized, it will be understood by those skilled in the art that the advantages of our invention of an integrated fuel cell and electrolysis cell with our inventor's mode of water transport and storage can be realized in many system arrangements.

For example, the hydrogen or oxygen electrode of the fuel cell could be made from a catalysized nickel sinter and could thereby perform the function of the water storage matrix; also, it is contemplated that the water storage matrix may be separate from and positioned adjacent to and between the fuel cell hydrogen electrode and the water transport matrix. Therefore, it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. A regenerative fuel cell system which operates on hydrogen and oxygen, comprising:

a housing:

a first assembly disposed in said housing including a fuel cell having a hydrogen electrode, a first oxygen electrode and an electrolyte matrix disposed therebetween, and including a first oxygen passage in fluid communication with said first oxygen electrode, said first oxygen electrode being composed of a first material;

a second assembly disposed in said housing including an electrolysis cell having a hydrogen electrode, a second oxygen electrode and an electrolyte matrix disposed therebetween, and including a second oxygen passage in fluid communication with said second oxygen electrode, said second oxygen electrode being composed of a second material different from said first material, said fuel cell hydrogen electrode and said electrolysis cell hydrogen electrode being spaced apart and in facing relationship;

a water matrix disposed in the space between and in contact with said fuel cell hydrogen electrode and said electrolysis cell hydrogen electrode and including portions bridging said hydrogen electrodes for transporting water produced by said fuel cell during fuel cell operation to said electrolysis cell for use during electrolysis cell operation, said water matrix shaped to define hydrogen passages in communication with said fuel cell hydrogen electrode and said electrolysis cell hydrogen electrode, said first assembly having a water storage matrix associated with one of said fuel cell electrodes for storing water produced by said fuel cell during fuel cell operation, said water storage matrix being adjacent said first oxygen electrode of said fuel cell and in fluid communication with said water matrix;

fluid connecting means in communication with said hydrogen passages and said oxygen passages for providing hydrogen to said hydrogen passages and oxygen to said oxygen passages, and including seal means preventing said hydrogen passages from communicating with said oxygen passages; and means for operating said first assembly always as a fuel cell and said second assembly always as an electrolysis cell, said means being in electrical communication with said assemblies.

* * * * *